US008746803B2

(12) United States Patent
Shiotani et al.

(10) Patent No.: US 8,746,803 B2
(45) Date of Patent: Jun. 10, 2014

(54) SEAT BELT RETRACTOR AND SEAT BELT APPARATUS INCLUDING THE SAME (75) Inventors: Masahiro Shiotani, Tokyo (JP); Yusuke Iura, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/515,478

(22) PCT Filed: Dec. 10, 2010

(86) PCT No.: PCT/JP2010/007205
§ 371 (c)(1),
(2), (4) Date: Jun. 12, 2012

(87) PCT Pub. No.: WO2011/074224
PCT Pub. Date: Jun. 23, 2011

(65) Prior Publication Data
US 2012/0248847 A1   Oct. 4, 2012

(30) Foreign Application Priority Data
Dec. 15, 2009   (JP) .................................. 2009-283844

(51) Int. Cl.
*B60R 22/42*   (2006.01)
*B60R 22/40*   (2006.01)

(52) U.S. Cl.
USPC ............ 297/476; 297/478; 297/480; 242/374

(58) Field of Classification Search
USPC .......... 297/474, 475, 476, 479, 480; 242/374; 280/806, 807
See application file for complete search history.

(56) References Cited

U.S. PATENT DOCUMENTS

| 4,261,531 | A | * | 4/1981 | Naitoh | 242/385 |
| 4,295,684 | A | * | 10/1981 | Naitoh | 297/475 |
| 6,419,176 | B1 | * | 7/2002 | Mizuno | 242/374 |

(Continued)

FOREIGN PATENT DOCUMENTS

| CN | 1537755 A | 10/2004 |
| DE | 101 19 199 A1 | 4/2001 |

(Continued)

OTHER PUBLICATIONS

International Search Report mailed Feb. 1, 2011 in PCT/JP2010/007205 (2 pgs.).

(Continued)

*Primary Examiner* — David R Dunn
*Assistant Examiner* — Timothy J Brindley
(74) *Attorney, Agent, or Firm* — Foley & Lardner LLP (57) ABSTRACT

[Object] To provide a retractor that is manufacturable at a much lower cost by making a pretensioner operate more effectively, by minimizing the length of a pipe so that a weight reduction is realized effectively, and by easing the restriction for the shape of a guide member.
[Solution] A pipe 17 in which a plurality of balls as force transmitting members are provided includes an attaching portion 17c as a projection provided at one end portion 17a thereof. A guide member 18 having a guide surface 18c that guides the balls has attaching grooves 18 as recesses. The attaching portion 17c is fitted into the attaching grooves 18, whereby the pipe 17 is attached around the outer circumference thereof to the guide member 18 attached to a frame. Since the guide member 18 is provided on the outer circumference of the pipe 17, the pipe 17 can be shortened.

5 Claims, 9 Drawing Sheets

(56) References Cited

U.S. PATENT DOCUMENTS

| | | | |
|---|---|---|---|
| 6,419,272 B1* | 7/2002 | Yamaguchi et al. | 280/806 |
| 6,722,600 B2* | 4/2004 | Hamaue et al. | 242/374 |
| 7,124,974 B2* | 10/2006 | Shiotani et al. | 242/374 |
| 7,152,824 B2 | 12/2006 | Shiotani et al. | |
| 7,429,012 B2* | 9/2008 | Loffler et al. | 242/374 |
| 8,220,735 B2* | 7/2012 | Wang et al. | 242/374 |
| 2002/0053621 A1* | 5/2002 | Shiotani et al. | 242/374 |
| 2004/0095010 A1* | 5/2004 | Strobel | 297/475 |
| 2008/0017743 A1* | 1/2008 | Hiramatsu et al. | 242/379.1 |
| 2010/0066150 A1* | 3/2010 | Mori et al. | 297/475 |
| 2010/0084906 A1* | 4/2010 | Burrow et al. | 297/476 |
| 2010/0176649 A1* | 7/2010 | Kohama | 297/474 |
| 2011/0031800 A1* | 2/2011 | Motozawa | 297/475 |
| 2011/0140502 A1* | 6/2011 | Shiotani et al. | 297/475 |
| 2011/0140503 A1* | 6/2011 | Hiramatsu et al. | 297/475 |

FOREIGN PATENT DOCUMENTS

| | | |
|---|---|---|
| DE | 102 31 268 A1 | 1/2004 |
| DE | 103 56 180 A1 | 7/2004 |
| DE | 10 2006 045 198 A1 | 4/2008 |
| DE | 10 2007 058 279 A1 | 6/2009 |
| JP | 09-240427 | 9/1997 |
| JP | 2000-127895 | 5/2000 |
| JP | 2000-225920 | 8/2000 |
| JP | 2002-012127 | 1/2002 |
| JP | 2002-029379 | 1/2002 |
| JP | 2006-213131 | 8/2006 |
| JP | 2007513003 | 5/2007 |
| JP | 2008-024102 | 2/2008 |
| JP | 2009-184520 | 8/2009 |
| JP | 2009-255818 | 11/2009 |
| WO | WO 2005/054016 | 6/2005 |
| WO | WO 2009/128353 | 10/2009 |

OTHER PUBLICATIONS

Supplementary European Search Report EP Application No. 10837258.2 dated May 28, 2013.

Notice of Rejection dated Sep. 18, 2013 issued in connection with Japanese Patent Application No. 2009-283844.

Notice of First Rejection dated Jan. 30, 2014 in connection with Chinese Application No. 201080056495.X (6 pages).

* cited by examiner

SEAT BELT RETRACTOR AND SEAT BELT APPARATUS INCLUDING THE SAME

TECHNICAL FIELD

The present invention belongs to a technical field concerning seat belt retractors including pretensioners and to a technical field concerning seat belt apparatuses for vehicles.

BACKGROUND ART

Hitherto, various types of seat belt retractors including pretensioners have been developed for seat belt apparatuses to be provided in vehicles such as automobiles. In a pretensioner, in early stages of emergency such as a collision of a vehicle when a vehicle has undergone a deceleration greater than a normal deceleration, a spool of a seat belt retractor is rotated in a seat-belt-retracting direction with the use of a reactant gas generated by a gas generator, whereby the seat belt is retracted around the spool. Thus, the slack in the seat belt is quickly eliminated and a tension is applied to the seat belt, whereby the force of restraining the occupant is increased.

Examples of such a conventional pretensioner include a pretensioner in which a plurality of balls as force transmitting members are provided in a pipe (see PTL 1, for example). In times of emergency, the balls move within and along the pipe under a gas pressure produced by a reactant gas generated by a gas generator. The balls are guided along a guide surface of a guide member screwed to the inside of an open end portion of the pipe that is on a side opposite the side having the gas generator. The balls come out of the pipe via a cut portion provided in the pipe and push a plurality of pushing portions provided on a ring gear. The ring gear thus pushed rotates and causes a spool to rotate in a seat-belt-retracting direction, whereby the seat belt is retracted.

CITATION LIST

Patent Literature

PTL 1: Japanese Unexamined Patent Application Publication No. 2002-12127

SUMMARY OF INVENTION

Technical Problem

In the pretensioner disclosed by PTL 1, however, since the guide member is provided inside the pipe, the pipe needs to extend to a position where the balls leave the pushing portions of the ring gear. Therefore, the pipe is relatively long. Hence, problems arise not only in that the weight increases but also in that the pretensioner costs high because the pipe costs high.

Moreover, since the guide member needs to be provided inside the pipe, the shape of the guide member is limited and there is a discontinuity at the boundary between the inner circumferential surface of the pipe and the guide surface of the guide member. Therefore, the pipe needs to be precisely positioned relative to the guide member. Hence, production control costs increase.

In light of the above circumstances, the present invention is to provide a seat belt retractor that is manufacturable at a much lower cost by making a pretensioner operate more effectively; by minimizing the length of a pipe so that a weight reduction is realized effectively; and by easing the restriction for the shape of a guide member, and to provide a seat belt apparatus including the same.

Solution to Problem

To solve the above problems, a seat belt retractor according to the present invention comprises at least a frame, a seat belt, a spool that is rotatably supported by the frame and around which the seat belt is retracted, a locking mechanism that is provided on the frame and locks the rotation of the spool in a seat-belt-withdrawal direction in times of emergency, and a pretensioner that is provided on the frame and is activated in the times of emergency in such a manner as to rotate the spool in a seat-belt-retracting direction. The pretensioner includes at least a pipe having an open end portion at one end portion thereof, a specific number of force transmitting members that are movably provided in the pipe and transmit a force for rotating the spool in the seat-belt-retracting direction, a gas generator that is provided on a side of the pipe at another end and generates a gas in the times of emergency, a piston that is movably provided in the pipe and pushes the force transmitting members when moved by a pressure of the gas, a ring gear that is at least rotatably provided in the case and has a plurality of internal teeth on an inner circumference thereof and a plurality of pushing portions on an outer circumference thereof, the pushing portions being pushed by the force transmitting members, a pinion that is provided on a spool-side member in the case and has external teeth meshable with the internal teeth of the ring gear, the pinion causing the spool to rotate, and a guide member that is provided on the frame and guides the force transmitting members coming out of the open end portion of the pipe. An outer circumference of the open end portion of the pipe is attached to the guide member.

In the seat belt retractor according to the present invention, the open end portion of the pipe has a projection on the outer circumference thereof, the guide member has a recess, and the projection of the pipe is fitted into the recess of the guide member, whereby the outer circumference of the open end portion of the pipe is attached to the guide member.

In the seat belt retractor according to the present invention, an inner circumferential surface of the open end portion of the pipe and a guide surface of the guide member are flush with or substantially flush with each other.

In the seat belt retractor according to the present invention, a rotation stopping portion is provided between the outer circumference of the open end portion of the pipe and the guide member.

A seat belt apparatus according to the present invention comprises at least a seat belt retractor that retracts a seat belt, a tongue that is slidably supported by a seat belt withdrawn from the seat belt retractor, and a buckle that is provided on a vehicle body and to which the tongue is detachably anchored. The seat belt retractor is any of the above seat belt retractors according to the present invention.

Advantageous Effects of Invention

With the seat belt retractor according to the present invention configured as described above, the outer circumference of the open end portion of the pipe is attached to the guide member. That is, the guide member is provided on the outer circumference of the pipe. Since the guide member is not provided inside the pipe unlike the conventional case, the open end portion of the pipe can be positioned above the center of rotation of the ring gear. Therefore, the length of the pipe can be reduced. Consequently, the weight of the pretensioner can be reduced. Hence, the cost of the pretensioner can be reduced.

In particular, the pipe is attached to the guide member by simply fitting the projection provided on the outer circumference of the open end portion of the pipe into the recess provided in the guide member. Therefore, screws for attaching the guide member to the pipe that are used in the conventional case are not necessary, leading to a reduction in the number of components. Moreover, a further weight reduction corresponding to the quantity of unnecessary screws is realized.

Since the guide member is provided outside the pipe, the shape of the guide member is not limited and can be freely designed.

Moreover, the inner circumferential surface of the pipe and the guide surface of the guide member are flush with or substantially flush with each other. Hence, there is substantially no discontinuity at the boundary between the inner circumferential surface of the pipe and the guide surface of the guide member, and a smooth guide surface in which the inner circumferential surface of the pipe and the guide surface of the guide member are substantially continuous with each other can be obtained. Therefore, the movement of the balls from the pipe to the guide member becomes more smoothly. Consequently, the pretensioner can operate more effectively. In addition, since there is substantially no discontinuity at the boundary between the inner circumferential surface of the pipe and the guide surface of the guide member, the pipe is not necessarily positioned precisely relative to the guide member. Therefore, manufacturing process control costs can be reduced.

Furthermore, since the rotation stopping portion is provided between the outer circumference of the open end portion of the pipe and the guide member, the pipe is prevented from rotating when a connector of a wire through which an electrical signal is supplied is inserted into a connector connection port of the gas generator provided in the pipe. This facilitates the insertion of the connector into the gas generator.

Meanwhile, in the seat belt apparatus including the seat belt retractor according to the present invention, the seat belt retractor effectively activates the pretensioner. Furthermore, the shape of the guide member is not limited and can be freely designed. Therefore, the flexibility in installing the seat belt retractor onto the vehicle body is increased. In addition, the occupant restrainability of the seat belt apparatus can be effectively improved.

DESCRIPTION OF EMBODIMENTS

Embodiments of the present invention will now be described with reference to the drawings.

Figure 1:
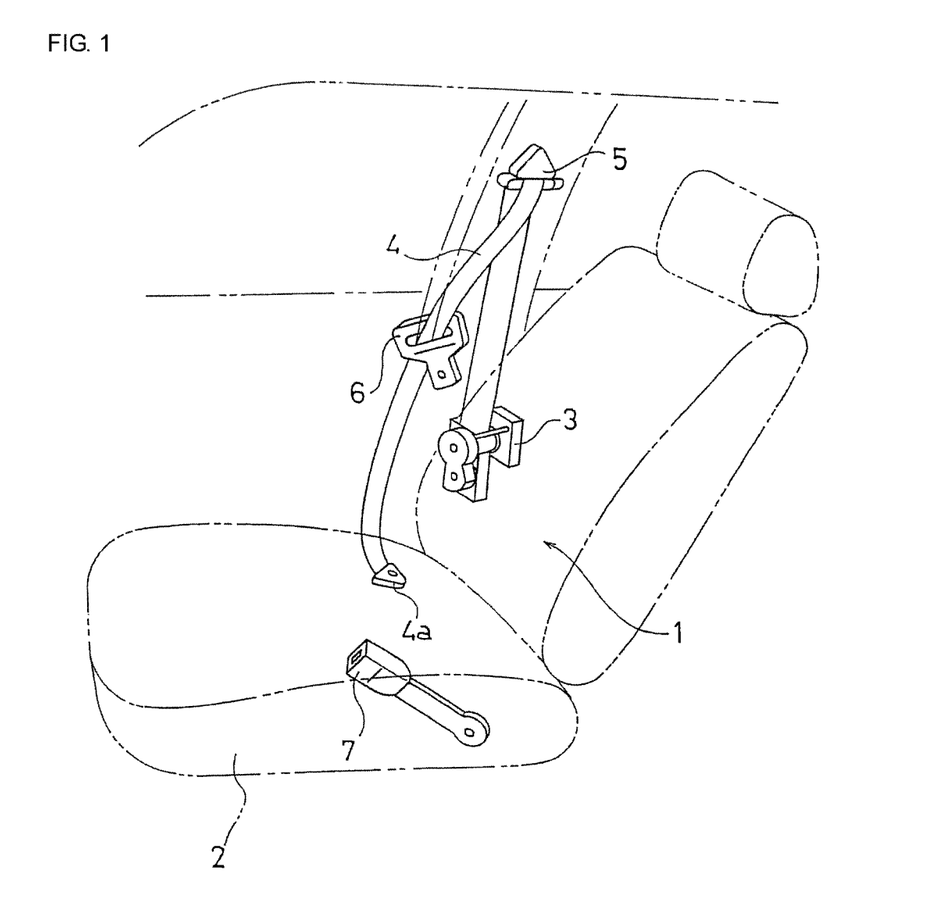
FIG. 1 schematically illustrates a seat belt apparatus including a seat belt retractor according to an exemplary embodiment of the present invention.

FIG. 1 schematically illustrates a seat belt apparatus including a seat belt retractor according to an exemplary embodiment of the present invention.

As illustrated in FIG. 1, a seat belt apparatus 1 according to this exemplary embodiment is basically the same as a conventionally known three-point seat belt apparatus. Referring to the drawing, reference character 1 denotes the seat belt apparatus, reference character 2 denotes a vehicle seat, reference numeral 3 denotes a seat belt retractor provided near the vehicle seat 2, reference numeral 4 denotes a seat belt that is withdrawably retractable by the seat belt retractor 3 and has at the tip thereof a belt anchor 4a that is to be secured to the floor of the vehicle body or the vehicle seat 2, reference numeral 5 denotes a guide anchor that guides the seat belt 4 withdrawn from the seat belt retractor 3 toward a shoulder of the occupant, reference numeral 6 denotes a tongue that is slidably supported by a portion of the seat belt 4 guided from the guide anchor 5, and reference numeral 7 denotes a buckle that is fixed to the floor of the vehicle body or the vehicle seat and into and with which the tongue 6 is to be disengageably inserted and engaged.

Operations of putting on and taking off the seat belt 4 of the seat belt apparatus 1 are also the same as those for the conventionally known seat belt apparatus.

The seat belt retractor 3 according to this exemplary embodiment is configured as a conventionally known emergency-locking seat belt retractor (ELR) or a conventionally known automatic-locking seat belt retractor (ALR).

Figure 2:
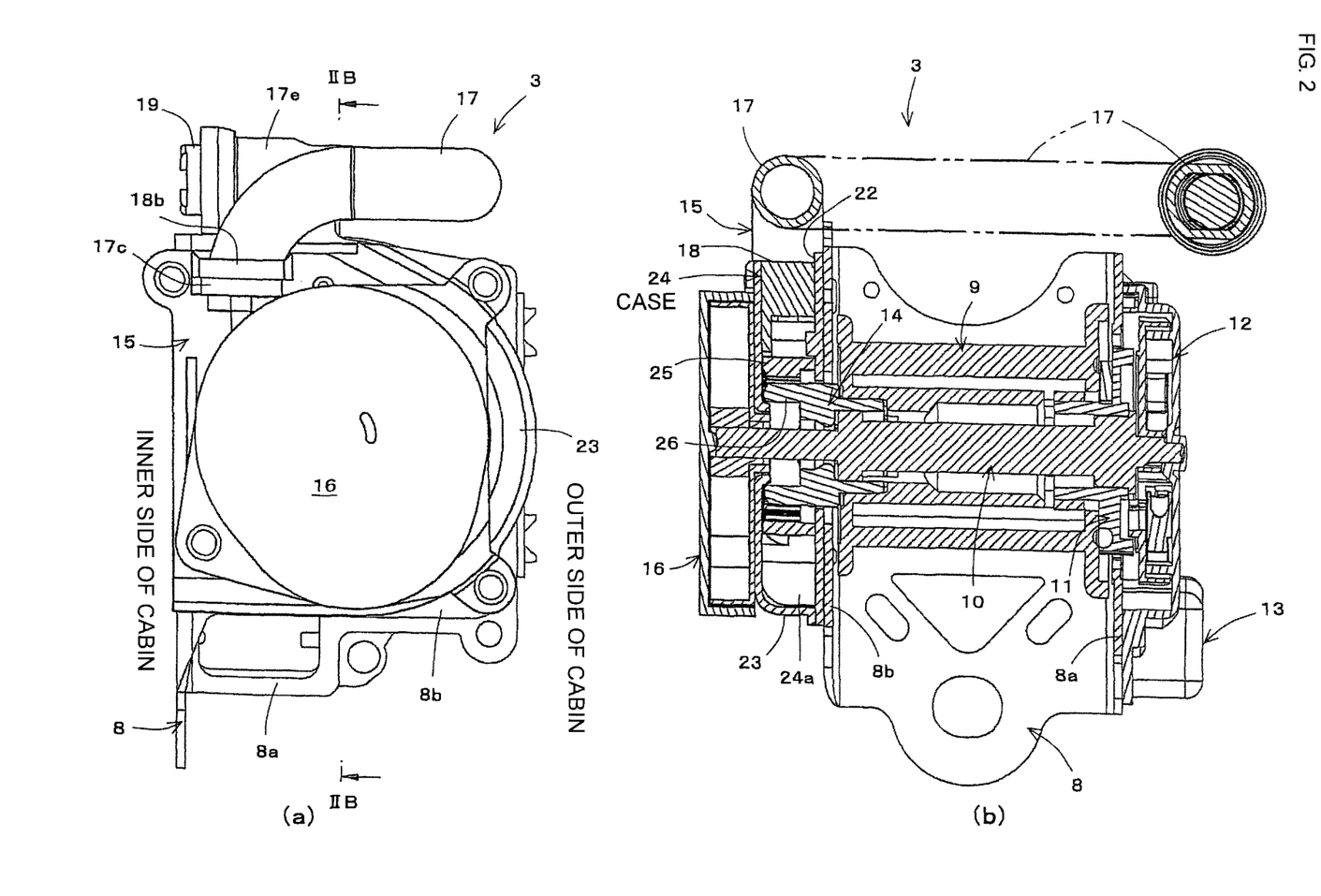
FIG. 2(a) is a left side view of the seat belt retractor according to the exemplary embodiment.
FIG. 2(b) is a sectional view taken along line IIB-IIB illustrated in FIG. 2(a).

FIGS. 2(a) and (b) illustrate a seat belt retractor including a pretensioner according to this exemplary embodiment.

The seat belt retractor 3 according to this exemplary embodiment is basically the same as a known seat belt retractor including a pretensioner disclosed by, for example, PTL 1 described above. Hence, elements and functions that are the same as those of the seat belt retractor disclosed by PTL 1 will be first described briefly.

As illustrated in FIGS. 2(a) and (b), the seat belt retractor 3 includes a rectangular U-shaped frame 8 having two sidewalls 8a and 8b, a spool 9 around which the seat belt 4 is retracted, a torsion bar 10 as an energy absorption (EA) mechanism, a locking base 11 corresponding to the locking member according to the present invention, a locking mechanism 12, a deceleration sensing mechanism 13, a cylindrical connecting member 14, a pretensioner 15 including a specific number (a plurality) of balls, and spring means 16 that constantly urges the spool 9 in a seat-belt-retracting direction. In the seat belt retractor 3 according to this exemplary embodiment, the spool 9 and the connecting member 14 are provided as separate bodies. In PTL 1, the spool 9 and the connecting member 14 are provided as an integral body.

In normal times in which the deceleration sensing mechanism 13 and the pretensioner 15 are not activated, when the seat belt 4 is withdrawn, the spool 9 rotates in a seat-belt-withdrawal direction and the seat belt 4 is withdrawn. In the normal withdrawal of the seat belt 4, since the deceleration sensing mechanism 13 is not activated, the locking mechanism 12 is not activated. Therefore, the spool 9 rotates together with the connecting member 14, the torsion bar 10, and the locking base 11. Hence, the seat belt 4 is easily withdrawn.

When the hand is taken off of the seat belt 4 after the seat belt 4 is withdrawn, the spool 9 rotates in the seat-belt-retracting direction with the urging force of the spring means 16 transmitted thereto via the connecting member 14. Then, the spool 9 retracts the entirety or substantially the entirety of the withdrawn portion of the seat belt 4. In the normal retracting of the seat belt 4, the spool 9 rotates together with the connecting member 14, the torsion bar 10, and the locking base 11. Therefore, the seat belt 4 is easily retracted.

Figure 4:
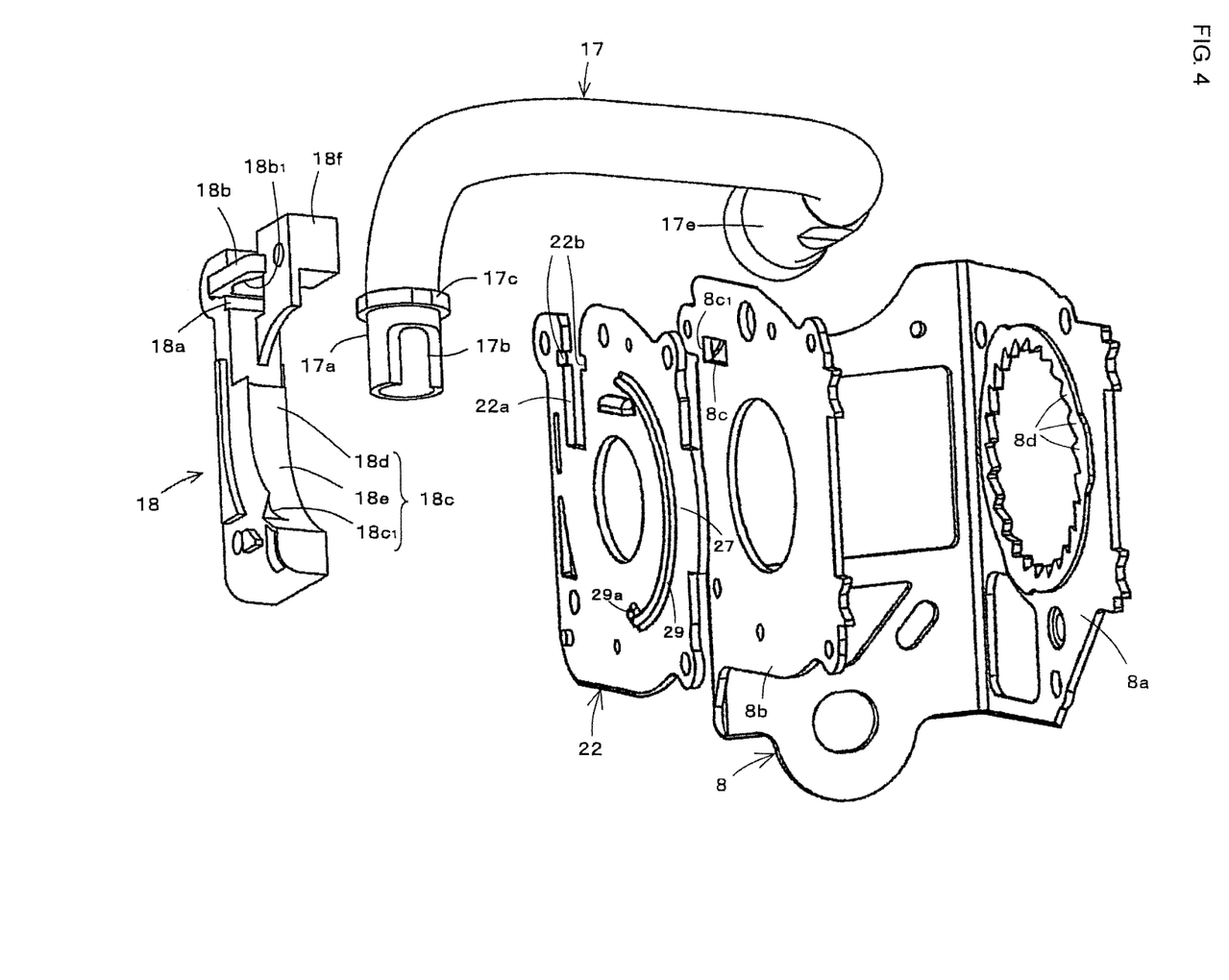
FIG. 4 is an exploded perspective view illustrating a pipe and a guide member included in the pretensioner according to the exemplary embodiment.

When a deceleration of such a degree as to activate the deceleration sensing mechanism 13 is applied to the vehicle that is moving, the deceleration sensing mechanism 13 is activated and the locking mechanism 12 is activated. Then, a non-illustrated pawl provided on the locking base 11 rotates and engages with the below-described locking teeth 8d, illustrated in FIG. 4, provided on the sidewall 8a. Thus, the rotation of the locking base 11 in the seat-belt-withdrawal direction is locked. Meanwhile, the inertia of the occupant acts in such a manner as to withdraw the seat belt 4, and the spool 9 tends to rotate in the seat-belt-withdrawal direction relative to the locking base 11. Consequently, the torsion bar is twisted. This torsional deformation of the torsion bar produces a resistance that prevents the rotation of the spool 9 in the seat-belt-withdrawal direction. Thus, the occupant is restrained by the seat belt 4. In this state, the kinetic energy of the occupant is partially absorbed by the torsional deformation of the torsion bar. Therefore, the force applied to the occupant from the seat belt 4 is limited.

Other basic configurations and functions of the seat belt retractor 3 according to this exemplary embodiment can be easily understood by referring to the description of PTL 1, and detailed description thereof is therefore omitted.

A feature configuration of the seat belt retractor 3 according to this exemplary embodiment, i.e., the pretensioner 15 according to this exemplary embodiment, will now be described.

Figure 3:
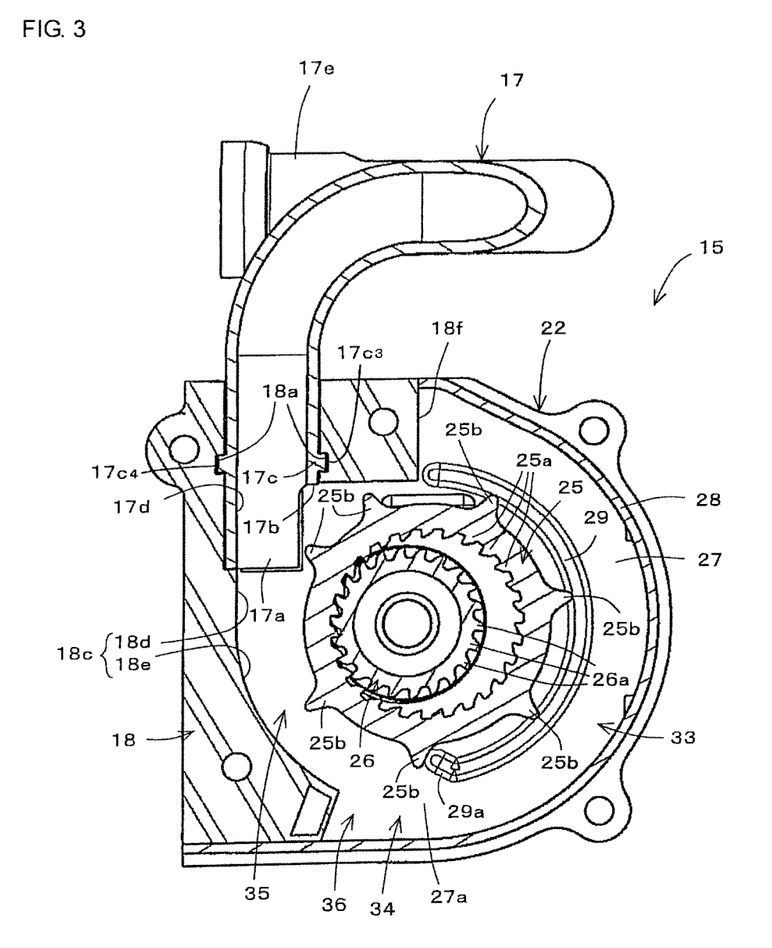
FIG. 3 illustrates a pretensioner of the seat belt retractor illustrated in FIG. 2(a) with a cover, balls, and spring means thereof removed.

FIG. 3 illustrates the pretensioner of the seat belt retractor illustrated in FIG. 2(a) with a cover, balls, and the spring means thereof removed. FIG. 4 is an exploded perspective view illustrating a pipe and a guide member included in the pretensioner according to this exemplary embodiment.

As illustrated in FIGS. 3 and 4, the pretensioner 15 includes the pipe 17. One end portion 17a of the pipe 17 forms an open end portion. The one end portion 17a has a cut portion 17b extending in the axial direction of the pipe 17 from the open end of the pipe 17, and an attaching portion 17c in the form of a flange-shaped projection.

Figure 5:
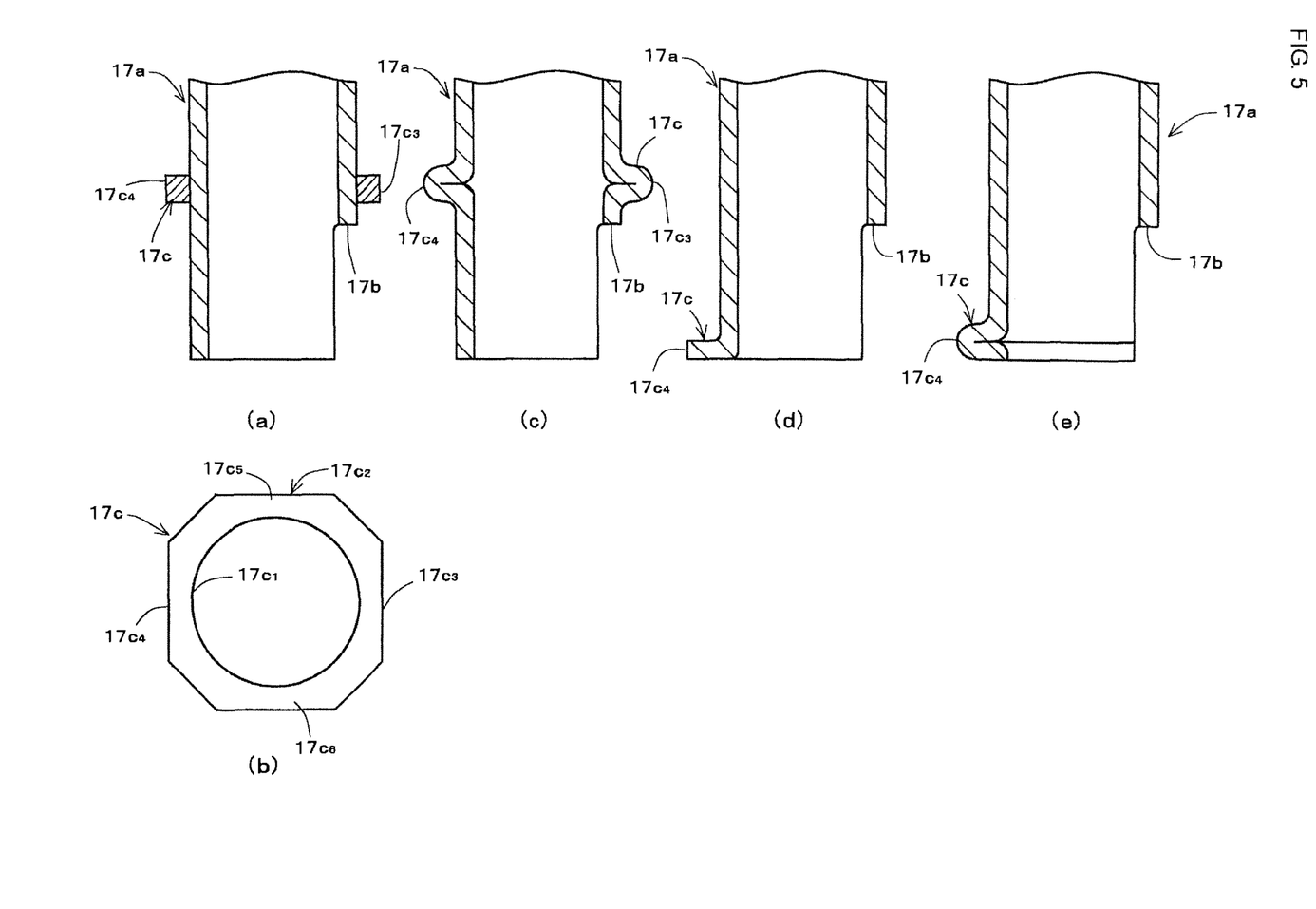
FIG. 5(a) is a sectional view illustrating one end portion of the pipe provided with an attaching portion.
FIG. 5(b) is a plan view of the attaching portion.
FIGS. 5(c) to (e) are sectional views illustrating other examples of the one end portion of the pipe.

As illustrated in FIGS. 5(a) and (b), the attaching portion 17c of the pretensioner 15 according to this exemplary embodiment has a circular shape with an inner circumferential hole $17c_1$ into which the pipe 17 is fitted and an outer circumferential shape $17c_2$ that is a polygon. In such a case, the outer circumferential shape $17c_2$ of the attaching portion 17c includes at least a pair of fitting sides $17c_3$ and $17c_4$ that are parallel to each other. The attaching portion 17c is fitted onto the pipe 17 and is brazed to a position of the pipe 17 above the cut portion 17b. The one end portion 17a of the pipe 17 is attached to a guide member 18.

As illustrated in FIGS. 3 and 4, the guide member 18 includes a pair of attaching grooves 18a facing parallel to each other with the respective right sides thereof in FIG. 4 being open, an anchoring portion 18b provided above the attaching grooves 18a, and a guide surface 18c. The anchoring portion 18b has a fitting hole $18b_1$ into which the pipe 17 is fitted. The fitting hole $18b_1$ has a substantially U shape whose right side in FIG. 4 is open. A portion of the pipe 17 above the attaching portion 17c is fitted into the fitting hole $18b_1$ from the right side in FIG. 4. Furthermore, the pair of fitting sides $17c_3$ and $17c_4$ of the attaching portion 17c are fitted into the pair of attaching grooves 18a, respectively. In this state, the guide member 18 is secured to the sidewall 8b of the frame 8 with the below-described case base member 22 interposed therebetween, whereby the one end portion 17a of the pipe 17 is attached to the guide member 18. In such a state where the attaching portion 17c is fitted into the attaching grooves 18a, the pipe 17 is not rotatable about the center axis of the one end portion 17a. That is, the pair of fitting sides $17c_3$ and $17c_4$ of the outer circumferential shape $17c_2$ of the attaching portion 17c and the bottom surfaces of the attaching grooves 18a in combination form a rotation stopping portion for the pipe 17.

As illustrated in FIG. 4, the guide surface 18c includes a linear guide surface 18d, an arc-shaped guide surface 18e adjoining the linear guide surface 18d and being concentric or substantially concentric with the axis of rotation of the spool 9, and an arc-shaped guide wall surface $18c_1$ extending continuously along the linear guide surface 18d and the arc-shaped guide surface 18e. The arc-shaped guide wall surface $18c_1$ matches or substantially matches the inside diameter of the pipe 17.

The one end portion 17a of the pipe 17 is attached to the guide member 18. In such a case, the attaching portion 17c is fitted into the attaching grooves 18a provided in the guide member 18 and is anchored by the anchoring portion 18b of the guide member 18. Furthermore, in the state where the one end portion 17a of the pipe 17 is attached to the guide member 18 and the guide member 18 is attached to the sidewall 8b of the frame with the case base member 22 interposed therebetween, a part $17c_5$ (illustrated in FIG. 5(b)) of the attaching portion 17c is anchored by an upper edge $8c_1$ of a rectangular small opening 8c provided in the sidewall 8b. In such a case, a pair of grooves 22b are provided in a cut recessed groove 22a provided in the case base member 22 and extending in the vertical direction with the upper side thereof being open. The attaching portion 17c extends through the pair of grooves 22b and is anchored at the small opening 8c. Furthermore, another part $17c_6$ of the attaching portion 17c of the pipe 17 is anchored on the upper side thereof by the anchoring portion 18b of the guide member 18, and the part $17c_5$ of the attaching portion 17c is anchored on the upper side thereof by the upper edge $8c_1$ of the small opening 8c of the sidewall 8b. Therefore, the pipe 17 is prevented from being detached upward from the guide member 18. That is, the anchoring portion 18b of the guide member 18 and the small opening 8c of the sidewall 8b in combination function as a detachment preventing member for the pipe 17. The pair of grooves 22b of the case base member 22 anchoring the attaching portion 17c also function as a detachment preventing member for the pipe 17.

In the state where the one end portion 17a of the pipe 17 is attached to the guide member 18b, the guide member 18 resides on the outer circumference of the pipe 17 and the end face of the one end portion 17a of the pipe 17 resides above the linear guide surface 18d included in the guide surface 18c of the guide member 18. Furthermore, in a section taken along a plane extending in the axial direction passing through the radial center of the pipe 17, the linear guide surface 18d included in the guide surface 18c resides on a line as an extension of an inner circumferential surface 17d of the pipe 17. Furthermore, a portion of the arc-shaped guide wall surface $18c_1$ that extends along the linear guide surface 18d is flush with or substantially flush with the inner circumferential surface 17d of the pipe 17. Therefore, the inner circumferential surface of the one end portion 17a of the pipe 17 and the guide surface 18c of the guide member 18 in combination form a continuous guide surface. Hence, the discontinuity at the boundary between the inner circumferential surface of the pipe and the guide surface of the guide member that is seen in the conventional art is not produced.

Figure 6:
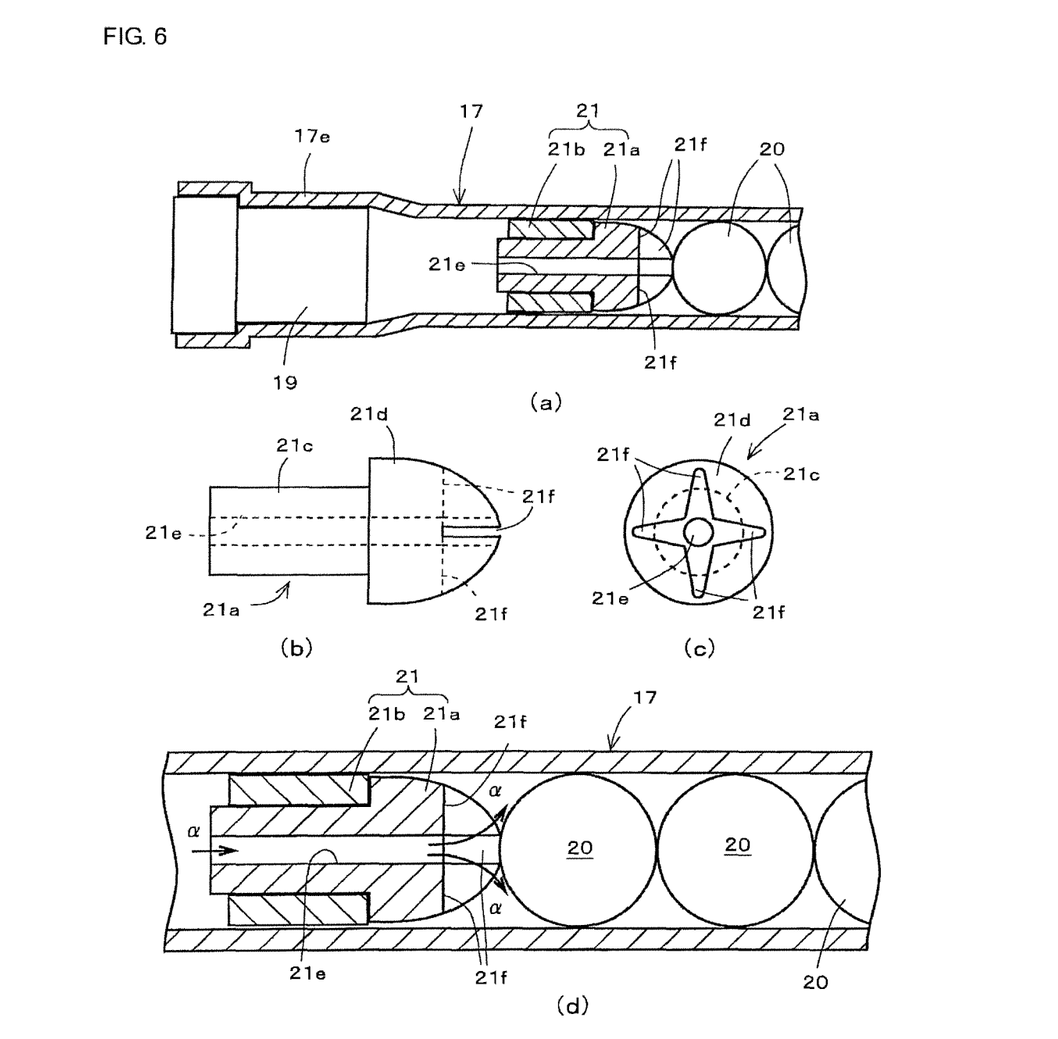
FIG. 6(a) is a sectional view of part of the pretensioner according to the exemplary embodiment illustrating a gas generator, a piston, and some balls.
FIG. 6(b) is a front view of the piston.
FIG. 6(c) is a right side view of the piston.
FIG. 6(d) illustrates a state of the piston when the pretensioner is activated.

As illustrated in FIG. 6(a), a gas generator 19 that generates a reactant gas is provided in another end portion 17e of the pipe 17. In such a case, in the state where the one end portion 17a of the pipe 17 is attached to the guide member 18, a connector insertion port of the gas generator 19 faces a cabin side in the lateral direction of the vehicle. Therefore, a connector of a wire through which an electrical signal is supplied to the gas generator 19 is easily insertable into the connector insertion port. Furthermore, the connector insertion port of the gas generator 19 faces the inner side of the cabin in a direction substantially orthogonal to the axial direction of the one end portion 17a of the pipe 17. Since the rotation stopping portion for the pipe 17 is formed between the attaching portion 17c of the pipe 17 and the attaching grooves 18a of the guide member 18 as described above, the pipe 17 is prevented from rotating when the connector is inserted into the gas generator 19. This further facilitates the insertion.

As illustrated in FIGS. 6(a) and (d), there are provided inside the pipe 17 a specific number of balls 20 that correspond to the force transmitting members according to the present invention and are made of metal such as iron or aluminum, and a piston 21 that is movable and pushes the balls 20 when receiving a gas pressure produced by the gas generator 19. The piston 21 includes a piston body 21a made of metal similarly to the balls 20 and a piston ring 21b made of nonmetal such as silicon or resin.

As illustrated in FIGS. 6(b) and (c), the piston body 21a includes a columnar shaft portion 21c provided on a side thereof nearer to the gas generator 19 and a substantially hemispherical head portion 21d provided on a side thereof nearer to the balls 20. The shaft portion 21c and the head portion 21d are provided as an integral body having an exhaust hole 21e bored in the axial direction through the shaft portion 21c and the head portion 21d. Furthermore, the head portion 21d has four exhaust grooves 21f communicating with the exhaust hole 21e and arranged in a cross shape. The width of each of the exhaust grooves 21f is largest at the center and gradually decreases from the center toward the tip. The exhaust grooves 21f prevent the exhaust hole 21e from being sealed by a ball 20 in a state where the head portion 21d of the piston 21a is in contact with the ball 20. Therefore, even in the state where the head portion 21d of the piston body 21a is in contact with the ball 20, the side of the piston 21 nearer to the gas generator 19 and the side of the piston 21 nearer to the balls 20 constantly communicate with each other via the exhaust hole 21e and the exhaust grooves 21f.

The piston ring 21b has a cylindrical shape and is fitted onto the shaft portion 21c of the piston body 21a. The piston ring 21b is capable of sealing the space between the outer circumferential surface of the shaft portion 21c and the inner circumferential surface of the pipe 17 airtightly or substantially airtightly and is slidable along the inner circumferential surface of the pipe 17.

The gas generated by the gas generator 19 pushes the piston 21 toward the right side in FIG. 6(d), whereby the piston 21 pushes the balls 20 toward the same side. As represented by arrows α in FIG. 6(d), the gas from the gas generator 19 is allowed to flow at a specific rate through the exhaust hole 21e and the exhaust grooves 21f from the side of the piston 21 nearer to the gas generator 19 toward the side of the piston 21 nearer to the balls. In such a case, even in the state where the head portion 21d of the piston body 21a is in contact with the ball 20, the gas is allowed to flow toward the side of the piston 21 nearer to the balls 20 through the exhaust grooves 21f.

The pretensioner 15 includes the case base member 22. The case base member 22 is attached to the sidewall 8b. The guide member 18 is also attached to the sidewall 8b of the frame 8 with the case base member 22 interposed therebetween. A cover 23 is attached to the case base member 22 and to the guide member 18. The case base member 22, the guide member 18, and the cover 23 in combination form a case 24 of the pretensioner 15 that has an internal space 24a.

As illustrated in FIGS. 2(b) and 3, a ring gear 25 is provided in the internal space 24a of the case 24 in such a manner as to be rotatable and movable toward the right side in FIG. 3 (FIG. 3 illustrates a state after the ring gear 25 has moved to the right side). The ring gear 25 has a plurality of internal teeth 25a on the inner circumferential surface thereof.

The ring gear 25 has a plurality of (seven in the exemplary embodiment illustrated in the drawing) levers 25b, which correspond to the pushing portions of the present invention, projecting from the outer circumferential surface thereof. In normal times when the pretensioner 15 is not activated, the circumferential gap between a lever 25b that first comes into contact with a first ball 20 and a lever 25b clockwise adjacent thereto is set to such a size as to receive part of one ball 20. The other circumferential gaps between adjacent ones of the levers 25b are each set to such a size as to sequentially receive corresponding two of the balls 20 that are in contact with each other. The levers 25b of the ring gear 25 are each allowed to advance into the pipe 17 via the cut portion 17b provided in the one end portion 17a of the pipe 17.

The connecting member 14 of the seat belt retractor 3 is provided with a circular pinion 26 such that the pinion 26 is rotatable together with the connecting member 14 (although not illustrated, the pinion 26 and the connecting member 14 may be provided as an integral body, with the spool 9 and the connecting member 14 provided as an integral body).

The pinion 26 has a plurality of external teeth 26a. The internal teeth 25a of the ring gear 25 are meshable with the external teeth 26a of the pinion 26. When the pretensioner 15 is activated, the balls 20 apply to each of the levers 25b that advances into the pipe 17 via the cut portion 17b of the pipe 17 a force that pushes the ring gear 25 and also apply to the ring gear 25 a translational moving force acting toward the pinion 26.

In the pretensioner 15 according to this exemplary embodiment, the arrangement of the pipe 17 (the piping) is designed such that, in a state where the pretensioner 15 is attached to the vehicle body, the end of the one end portion 17a resides at the lowest position as illustrated in FIG. 3. In such a case, the position of the end of the one end portion 17a is slightly above the center of rotation of the pinion 26 (i.e., the center of rotation of the spool 9). Therefore, the balls 20 each transmit the force to a corresponding one of the levers 25b of the ring gear 25 in a direction substantially along a tangent to the ring gear 25 and in the seat-belt-retracting direction. Consequently, the balls 20 each transmit the force to the ring gear 25 most efficiently.

The pipe 17 is bent at a substantially right angle above the frame 9 in such a manner as to face toward the outer side of the cabin and to extend linearly and substantially horizontally. The pipe 17 is further bent at a substantially right angle near a free end of the sidewall 8b in such a manner as to extend linearly and substantially horizontally in the anteroposterior direction of the vehicle. The pipe 17 is further bent at a substantially right angle near the sidewall 8a toward the inner side of the cabin in such a manner as to extend linearly and substantially horizontally. Therefore, the gas generator 19 extends substantially horizontally above a fixed-end side of the sidewall 8a of the frame 8 and toward the inner side of the cabin.

The case base member 22 has a guide groove 27 on the case-base-member side that guides the balls 20. In such a case, the guide groove 27 on the case-base-member side has a substantially arc shape corresponding to a circle that is substantially concentric with the ring gear 25 that is in a state illustrated in FIG. 3 in which the ring gear 25 has moved to the right side and the internal teeth 25a thereof have meshed with the external teeth 26a of the pinion 26. The guide groove 27 on the case-base-member side is provided on the outer side with respect to the tips of the levers 25b of the ring gear 25 that is at the position illustrated in FIG. 3. Therefore, there is no chance of the levers 25b advancing into the guide groove 27 on the case-base-member side. The guide groove 27 on the case-base-member side is defined by a pair of a guide wall 28 on the case-base-member outer circumferential side and a guide wall 29 on the case-base-member inner circumferential side. The guide walls 28 and 29 on the outer and inner circumferential sides each have a substantially arc shape corresponding to a circle that is substantially concentric with the center of rotation of the pinion 26.

The guide wall 29 on the case-base-member inner circumferential side along which the balls 20 move has at the upstream end thereof an introducing portion 29a for the case-base-member-side groove that introduces the balls 20 into the guide groove 27 on the case-base-member side. The introducing portion 29a for the case-base-member-side groove forms a sloping surface that slopes toward the inner side with respect to a tangent to the arc at the upstream end of the guide wall 29 on the case-base-member inner circumferential side. The case base member 22 has a ball introducing groove 27a on the case-base-member side that introduces the balls 20 into the guide groove 27 on the case-base-member side via the introducing portion 29a for the case-base-member-side groove.

Figure 7:
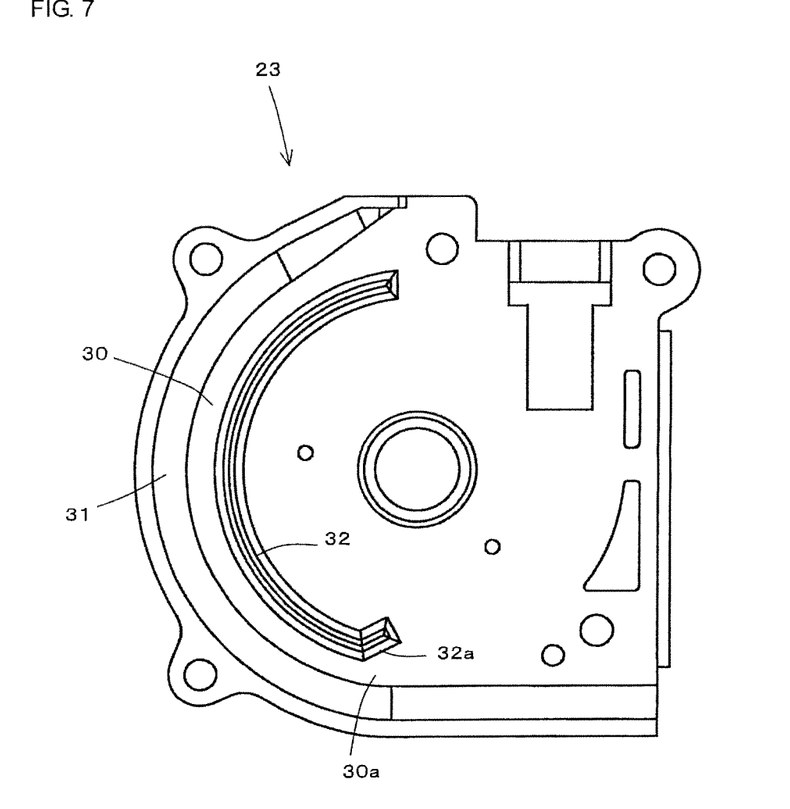
FIG. 7 illustrates the inner side of the cover of the pretensioner according to the exemplary embodiment.

As illustrated in FIG. 7, the cover 23 has a guide groove 30 on the cover side that guides the balls 20. The guide groove 30 on the cover side is defined by a pair of a guide wall 31 on the cover outer circumferential side and a guide wall 32 on the cover inner circumferential side. In such a case, the guide wall 31 on the cover outer circumferential side has an arc shape corresponding to a circle that is concentric with and has substantially the same radius as the guide wall 28 on the case-base-member outer circumferential side that has an arc shape. Furthermore, the circumferential length of the guide wall 31 on the cover outer circumferential side is the same as or substantially the same as that of the guide wall 28 on the case-base-member outer circumferential side. The guide wall 32 on the cover inner circumferential side has an arc shape corresponding to a circle that is concentric with and has substantially the same radius as the guide wall 29 on the case-base-member inner circumferential side that has an arc shape. Furthermore, the circumferential length of the guide wall 32 on the cover inner circumferential side is the same as or substantially the same as that of the guide wall 29 on the case-base-member inner circumferential side.

The guide wall 32 on the cover inner circumferential side along which the balls 20 move has at the upstream end thereof an introducing portion 32a for the cover-side groove that introduces the balls 20 into the guide groove 30 on the cover side. The introducing portion 32a for the cover-side groove forms a sloping surface that slopes toward the inner side with respect to a tangent to the arc at the upstream end of the guide wall 32 on the cover inner circumferential side. In such a case, the angle of slope of the introducing portion 32a for the cover-side groove with respect to the tangent to the arc and the length of the introducing portion 32a for the cover-side groove are the same as or substantially the same as the angle of slope of the introducing portion 29a for the case-base-member-side groove with respect to the tangent to the arc and the length of the introducing portion 29a for the case-base-member-side groove, respectively. The cover 23 has a ball introducing groove 30a on the cover side that introduces the balls 20 into the guide groove 30 on the cover side via the introducing portion 32a for the cover-side groove.

In the state where the cover 23 is attached to and is combined with the case base member 22, the guide wall 28 on the case-base-member outer circumferential side and the guide wall 31 on the cover outer circumferential side substantially coincide with each other while the guide wall 29 on the case-base-member inner circumferential side and the guide wall 32 on the cover inner circumferential side substantially coincide with each other. Hence, the guide groove 27 on the case-base-member side and the guide groove 30 on the cover side in combination form an arch-shaped path 33 along which the balls 20 move. Meanwhile, the introducing portion 29a for the case-base-member-side groove and the ball introducing groove 30a on the cover side substantially coincide with each other. Hence, the introducing portion 29a for the case-base-member-side groove and the ball introducing groove 30a on the cover side in combination form an introducing path 34 that introduces the balls 20 coming out of the pipe 17 and causing the ring gear 25 to rotate into the arch-shaped path 33.

In the pretensioner 15 according to this exemplary embodiment, the arch-shaped path 33, the introducing path 34, and a guide path 35 defined between the guide surface 18c of the guide member 18 and the ring gear 25 in combination form a ball housing chamber having a substantially arc shape and extending along the outer circumference of the ring gear 25. In such a case, there is no chance of the levers 25b of the ring gear 25 advancing into a portion of the ball housing chamber that is formed of the arch-shaped path 33 and the introducing path 34. As illustrated in FIG. 3, the guide member 18 includes a stopper portion 18f. The stopper portion 18f substantially seals the downstream end of the arch-shaped path 33. Furthermore, a small ball receiving portion 36 that receives some balls 20 such that the levers 25b of the ring gear 25 do not come into contact with the balls 20 is provided below a portion of the guide path 35 adjoining the introducing path 34. The arch-shaped path 33, the introducing path 34, the guide path 35, and the ball receiving portion 36 are all provided in the case 24.

How the seat belt retractor 3 according to this exemplary embodiment configured as described above operates will now be described.

The seat belt retractor 3 and the pretensioner 15 according to this exemplary embodiment basically operate in the same manner as the conventional pretensioner employing a plurality of balls disclosed by PTL 1 in the following process: in times of emergency such as a collision of the vehicle when a great deceleration is applied to the vehicle, the pretensioner 15 is activated and the spool 9 of the seat belt retractor 3 is then rotated in the seat-belt-retracting direction.

Figure 8:
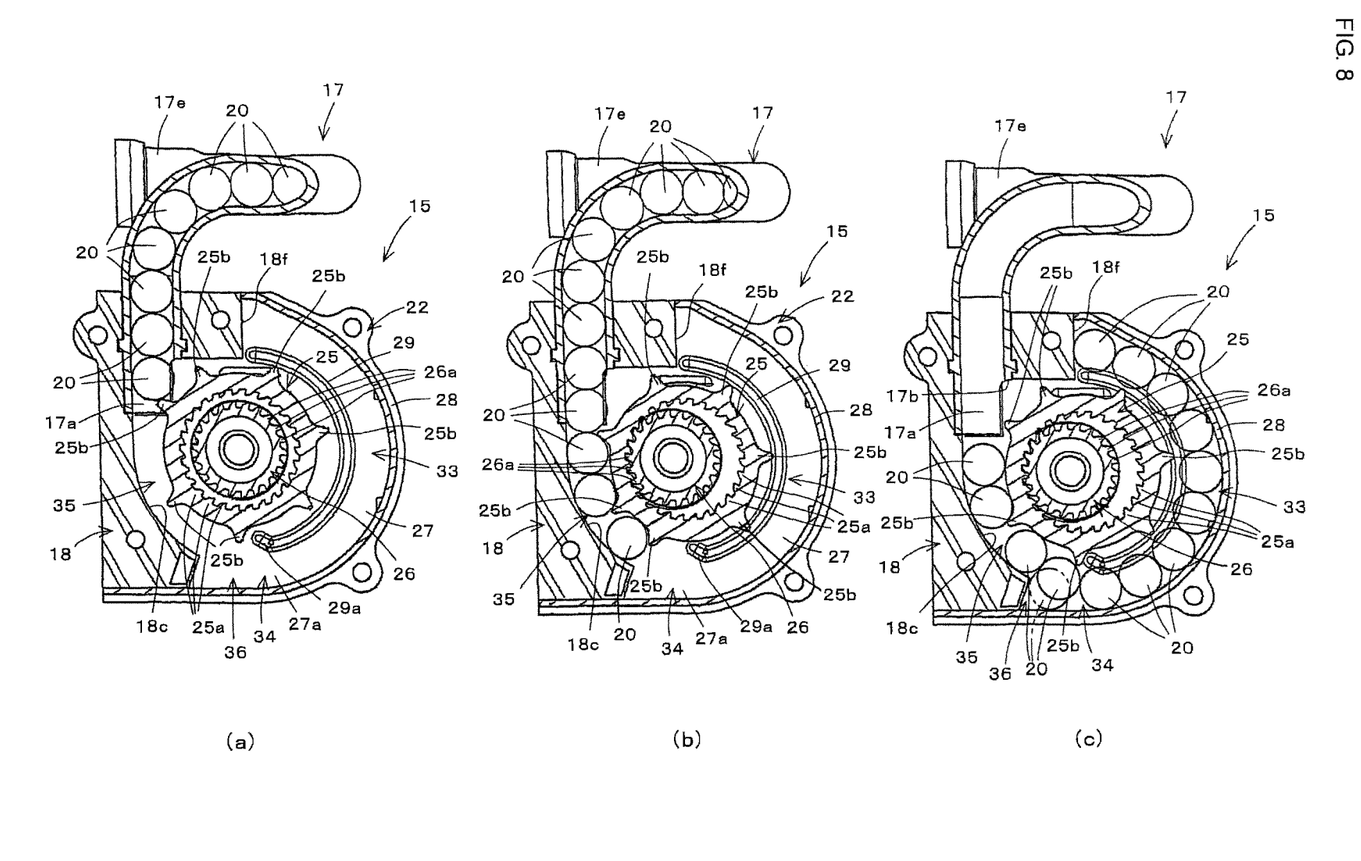
FIG. 8 illustrates how the pretensioner operates and includes part (a) illustrating a non-activated state, part (b) illustrating a state immediately after the start of operation, and part (c) illustrating a state where the operation is complete.

As illustrated in FIG. 8(a), when the pretensioner 15 is not activated, the ring gear 25 is retained substantially concentrically with the pinion 26 and in such a manner as to be not rotatable and not movable toward the right side, as in the case of the pretensioner disclosed by PTL 1. Therefore, the ring gear 25 is retained in a state where the internal teeth 25a thereof are not in mesh with the external teeth 26a of the pinion 26. Meanwhile, the first ball 20 is retained in contact with a corresponding one of the levers 25b. In such a case, the first ball 20 is advanceable into a space between corresponding two of the levers 25b that are adjacent to each other with a small gap. Meanwhile, the balls 20 subsequent to the first ball 20 are adjacent to and in contact with one another in the pipe 17. In this state, the gas generator 19 does not generate the gas, and the balls 20 do not substantially push the levers 25b.

In times of emergency described above, the deceleration sensing mechanism 13 and the locking mechanism 12 are activated as in the conventional case, the rotation of the locking base 11 in the seat-belt-withdrawal direction is locked, and the as generator 19 is activated to generate the gas. The as thus generated pushes the piston 21. Therefore, the piston 21 applies a large pushing force to the balls 20 one of which is in contact with the piston 21. The pushing force is transmitted to the first ball 20, which is in contact with the corresponding lever 25, via the other balls 20 from the upper side toward the lower side. Then, the first ball 20 under the pushing force causes the ring gear 25 to move toward the right side and to rotate counterclockwise in FIG. 2(a). Subsequently, as illustrated in FIG. 8(b), the internal teeth 25a of the ring gear 25 come into mesh with the external teeth 26a of the pinion 26, whereby the pinion 26 starts to rotate in the same direction as the ring gear 25. The start of rotation of the pinion 26 causes, via the pinion 26 and the connecting member 14, the spool 9 to start to rotate in the seat-belt-retracting direction, whereby the seat belt 4 that is put around the occupant starts to be retracted. In this state, since the ring gear 25 is pushed downward by the balls 20, the spool 9 is also pushed downward via the pinion 26. In this state, since the spool 9 is pulled upward by the seat belt 4, the rotational resistance occurring when the ring gear 25 causes the pinion 26 and the spool 9 to rotate is relatively small.

When the first ball 20 is received between the corresponding lever 25b and another lever 25b that are arranged with the small gap and a subsequent second ball 20 comes into contact with the other lever 25b clockwise adjacent to the lever 25b having been in contact with the first ball 20, the pushing force applied from the second ball 20 to the other lever 25b causes the ring gear 25 and the pinion 26 to further rotate together counterclockwise. In this state, the pushing force applied from the first ball 20 to the corresponding lever 25b is substantially removed. Two balls 20, i.e., the second ball 20 and a third ball 20, push the other lever 25b and are received between the other lever 25b and a subsequent lever 25b clockwise adjacent thereto. When a fourth ball 20 subsequent to the third ball 20 comes into contact with the subsequent lever 25b, the pushing force applied from the fourth ball 20 to the subsequent lever 25b causes the ring gear 25 and the pinion 26 to further rotate together counterclockwise. In this state, the pushing force applied from the second and third balls 20 to the corresponding lever 25b is substantially removed. Thus, the levers 25b are sequentially pushed by the balls 20, whereby the ring gear 25 and the pinion 26 rotate counterclockwise. That is, the spool 9 is rotated in the seat-belt-retracting direction, whereby the seat belt 4 is retracted around the spool 9.

As illustrated in FIG. 8(b), the first ball 20 that has substantially no pushing force to be applied to the lever 25b is guided by the lever 25b along with the rotation of the ring gear 25 and moves along the guide path 35. Subsequently, as illustrated in FIG. 8(c), the first ball 20 advances into the introducing path 34, where the first ball 20 leaves the lever 25b, is guided into the introducing path 34, and moves into the arch-shaped path 33. Similarly, the second and subsequent balls 20 that have substantially no pushing force to be applied to the corresponding levers 25b are sequentially guided into the introducing path 34 and move into the arch-shaped path 33. While the balls 20 are moving along the introducing path 34 and the arch-shaped path 33, the balls 20 do not come into contact with any levers 25b of the ring gear 25. In other words, the rotation of the ring gear 25 is free from the influence of the balls 20 residing in the introducing path 34 and the arch-shaped path 33. Therefore, the pushing force of the balls 20 applied to the levers 25b is efficiently utilized for the rotation of the ring gear 25.

As represented by arrows α in FIG. 6(d), some of the gas generated by the gas generator 19 flows through the exhaust hole 21e and the exhaust grooves 21f of the piston 21 toward the side of the piston 21 nearer to the balls 20. Therefore, the pressure on the side of the piston 21 nearer to the gas generator 19 is prevented from becoming too high.

When the first ball 20 comes into contact with the stopper portion 18f or when the tension of the seat belt 4 acting to rotate the spool 9 in the seat-belt-withdrawal direction becomes equal to the force of the balls 20 acting to rotate the spool 9 in the seat-belt-retracting direction, the balls 20 stop moving. Hence, the ring gear 25 and the pinion 26 stop rotating, whereby the pretensioner 15 stops operating. Thus, the retraction of the seat belt 4 around the spool 9 performed by the pretensioner 15 ends. Consequently, the occupant is restrained more tightly by the seat belt 4.

Subsequently, the inertia of the occupant acts to withdraw the seat belt 4 and to rotate the spool 9 in the seat-belt-withdrawal direction. In this state, since the rotation of the locking base 11 in the seat-belt-withdrawal direction is locked, the torsion bar 10 undergoes torsional deformation. Since the torsional deformation of the torsion bar 10 causes the spool 9 to rotate in the seat-belt-withdrawal direction, the force applied from the seat belt 4 to the occupant is limited. That is, the torsion bar 10 undergoes an EA behavior.

While the torsion bar 10 is undergoing the EA behavior, the spool 9 rotates in the seat-belt-withdrawal direction. Therefore, the ring gear 25 rotates in the same direction. As illustrated in FIG. 8(c), when the ring gear 25 rotates, three of the balls 20 on the trailing end side are pushed back toward the pipe 17 by corresponding ones of the levers 25b of the ring gear 25. However, a fourth ball 20 counting from the trailing end and balls 20 on the leading end side (the side nearer to the first ball 20) with respect thereto are not in contact with any levers 25b of the ring gear 25 and are therefore not pushed back toward the pipe 17. In this state, the fourth ball 20 counting from the trailing end is received by the ball receiving portion 36 as represented by the dash-dot-dot line in FIG. 8(c). The fourth ball 20 counting from the trailing end and the balls 20 residing on the leading end side with respect thereto become immovable toward the pipe 17 because a fifth ball 20 adjacent, on the leading end side, to the fourth ball 20 comes into contact with the fourth ball 20. Thus, the backward movement of these balls toward the pipe 17 is prevented. That is, during the EA behavior, some of the balls 20, i.e., the three balls 20 on the trailing end side, are pushed back by the ring gear 25. Therefore, the influence of the balls 20 upon the rotation of the ring gear 25 in the seat-belt-withdrawal direction is suppressed. Since the influence of the balls 20 upon the rotation of the ring gear 25 in the seat-belt-withdrawal direction is suppressed while the torsion bar 10 is undergoing the EA behavior, the ring gear 25 rotates more smoothly. Consequently, the torsion bar 10 undergoes the EA behavior effectively.

With the seat belt retractor according to this exemplary embodiment, the guide member 18 to which the pipe 17 is attached is positioned outside the pipe 17. Since the guide member 18 is not provided inside the pipe 17 unlike the conventional case, the one end portion 17a, i.e., the open end portion, of the pipe 17 can be secured to a position above the center of rotation of the ring gear 25. Hence, the length of the pipe 17 can be reduced. Consequently, the weight of the pretensioner 15 can be reduced. Hence, the cost of the pretensioner 15 can be reduced.

In particular, the pipe 17 is attached to the guide member 18 by simply fitting the projection-type attaching portion 17c of the pipe 17 into the attaching grooves 18a of the guide member 18. Therefore, screws for attaching the pipe 17 to the guide member 18 that are used in the conventional case are not necessary, leading to a reduction in the number of components. Moreover, a further weight reduction corresponding to the quantity of unnecessary screws is realized.

Since the guide member 18 is provided outside the pipe 17, the shape of the guide member 18 is not limited and can be freely designed. Moreover, there is substantially no discontinuity at the boundary between the inner circumferential surface 17d of the pipe 17 and the guide surface 18c of the guide member 18, and a smooth guide surface in which the inner circumferential surface 17d and the guide surface 18c are substantially continuous with each other can be obtained. Therefore, the movement of the balls from the pipe 17 to the guide member 18 becomes more smoothly. Consequently, the pretensioner 15 can operate more effectively. In addition, since there is substantially no discontinuity at the boundary between the inner circumferential surface 17d of the pipe 17 and the guide surface 18c of the guide member 19, the pipe 17 is not necessarily positioned precisely relative to the guide member 18. Therefore, process control costs to be used for the manufacture of the seat belt retractor 3 can be reduced.

Furthermore, since the rotation stopper for the pipe 17 is provided between the attaching portion 17c of the pipe 17 having bends and the attaching grooves 18a of the guide member 18, the bent pipe 17 is prevented from rotating when a connector of a wire through which an electrical signal is supplied is inserted into a connector connection port of the gas generator 19 provided in the pipe 17. This facilitates the insertion of the connector into the gas generator 19.

Meanwhile, in the seat belt apparatus 1 including the seat belt retractor 3 according to this exemplary embodiment, the seat belt retractor 3 effectively activates the pretensioner 15. Furthermore, the shape of the guide member 18 is not limited and can be freely designed. Therefore, the flexibility in installing the seat belt retractor 3 onto the vehicle body is increased. In addition, the occupant restrainability of the seat belt apparatus 1 can be effectively improved.

Figure 9:
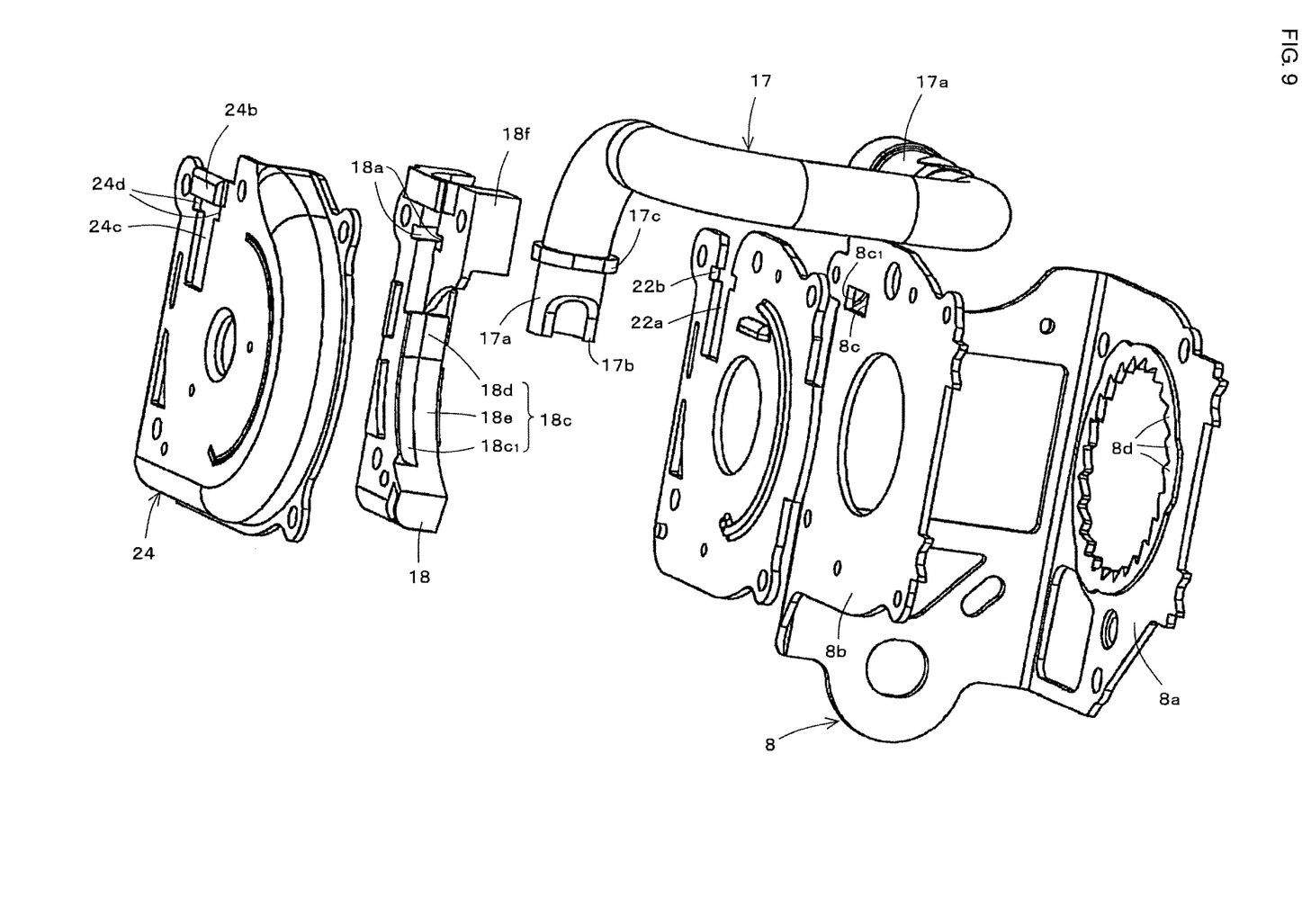
FIG. 9 is an exploded perspective view that partially and schematically illustrates a seat belt apparatus including a seat belt retractor according to another exemplary embodiment of the present invention.

FIG. 9 is an exploded perspective view that partially and schematically illustrates a seat belt apparatus including a seat belt retractor according to another exemplary embodiment of the present invention.

In the seat belt apparatus 3 according to the above exemplary embodiment, the anchoring portion 18b of the guide member 18 is used as part of the detachment preventing member for the pipe 17. In the seat belt apparatus 3 according to this exemplary embodiment illustrated in FIG. 9, the guide member 18 does not include the anchoring portion 18b. Instead, the case 24 of the pretensioner 15 includes an anchoring portion 24b similar to the anchoring portion 18b of the guide member 18. Specifically, the case 24 has a cut recessed groove 24c extending in the vertical direction with the upper side thereof being open. The anchoring portion 24b extends over the cut recessed groove 24c. Furthermore, a pair of attaching grooves 24d are provided in the cut recessed groove 24c at respective positions immediately below the anchoring portion 24b. Hence, the anchoring portion 24b forms an upper wall for the attaching grooves 24d. The other elements of the seat belt apparatus 1 according to this exemplary embodiment are the same as those of the above exemplary embodiment.

Similarly to the above exemplary embodiment, the attaching portion 17c of the pipe 17 extends through the pair of attaching grooves 24d and is anchored on the upper side thereof by the anchoring portion 24b of the case 24 and by the upper edge $8c_1$ of the small opening 8c provided in the sidewall 8b of the frame 8. Therefore, the pipe 17 is prevented from being detached upward from the guide member 18. That is, the anchoring portion 24b of the case 24 and the small opening 8c of the sidewall 8b in combination function as a detachment preventing member for the pipe 17. The pair of grooves 22b provided in the case base member 22 also anchor the attaching portion 17c and can thus function as detachment preventing members for the pipe 17. Other operational effects produced by the seat belt apparatus 1 according to this exemplary embodiment are the same as those of the above exemplary embodiment.

The seat belt retractor according to the present invention is not limited to the above exemplary embodiments, and various design changes can be made thereto. For example, in the above exemplary embodiments, the attaching portion 17c is brazed to the pipe 17. Alternatively, for example, the attaching portion 17c may be provided by forming a spur on the pipe 17 as illustrated in FIG. 5(c), by forming a flare on the pipe 17 as illustrated in FIG. 5(d), or by forming a flange on the pipe 17 as illustrated in FIG. 5(e). That is, various design changes can be made to the present invention within the scope defined by the claims.

INDUSTRIAL APPLICABILITY

The seat belt retractor and the seat belt apparatus according to the present invention are suitably applicable to a seat belt retractor including a pretensioner employing a plurality of force transmitting members such as balls, and to a seat belt apparatus for a vehicle including the seat belt retractor.

The invention claimed is:

1. A seat belt retractor comprising at least a frame; a seat belt; a spool that is rotatably supported by the frame and around which the seat belt is refracted; a locking mechanism that is provided on the frame and locks the rotation of the spool in a seat-belt-withdrawal direction in times of emergency; and a pretensioner that is provided on the frame and is activated in the times of emergency in such a manner as to rotate the spool in a seat-belt-retracting direction, wherein the pretensioner includes at least a case that is provided on the frame; a pipe having an open end portion at one end portion thereof; a specific number of force transmitting members that are movably provided in the pipe and transmit a force for rotating the spool in the seat-belt-retracting direction; a gas generator that is provided on a side of the pipe at another end and generates a gas in the times of emergency; a piston that is movably provided in the pipe and pushes the force transmitting members when moved by a pressure of the gas; a ring gear that is at least rotatably provided in the case and has a plurality of internal teeth on an inner circumference thereof and a plurality of pushing portions on an outer circumference thereof, the pushing portions being pushed by the force transmitting members; a pinion that is provided on a spool-side member in the case and has external teeth meshable with the internal teeth of the ring gear, the pinion causing the spool to rotate; and a guide member that is provided on the frame and guides the force transmitting members coming out of the open end portion of the pipe, and wherein the open end portion of the pipe has a projection on an outer circumference thereof formed integrally with the pipe, the guide member has a recess, and the projection of the pipe is fitted into the recess of the guide member, whereby the outer circumference of the open end portion of the pipe is attached to the guide member, wherein the projection of the pipe is in the form of a flange-shaped projection, the guide member has an anchoring portion, the recess has a pair of attaching grooves facing parallel to each other and each having an open end on the same side thereof, the anchoring portion has a fitting hole, and the fitting hole is separated from a guide surface of the guide member by the attaching grooves;

the outer circumference of the open end portion of the pipe is attached to the guide member by fitting the flange-shaped projection of the pipe into the attaching grooves from the open end side of the attaching grooves and fitting the pipe into the fitting hole of the anchoring portion of the guide member;

wherein an inner circumferential surface of the open end portion of the pipe and the guide surface of the guide member are flush with or substantially flush with each other.

2. The seat belt retractor according to claim 1, wherein a rotation stopping portion is provided between the projection of the pipe and the recess of the guide member.

3. A seat belt apparatus comprising at least a seat belt retractor that retracts a seat belt; a tongue that is slidably supported by a seat belt withdrawn from the seat belt retractor; and a buckle that is provided on a vehicle body and to which the tongue is detachably anchored, wherein the seat belt retractor is the seat belt retractor according to claim 1.

4. A seat belt apparatus comprising at least a seat belt retractor that retracts a seat belt; a tongue that is slidably supported by a seat belt withdrawn from the seat belt retractor; and a buckle that is provided on a vehicle body and to which the tongue is detachably anchored, wherein the seat belt retractor is the seat belt retractor according to claim 2.

5. The seat belt retractor according to claim 1, wherein the projection is provided by forming a spur on the pipe.

* * * * *